Feb. 17, 1953 R. C. TAYLOR ET AL 2,629,030
ACCELEROMETER
Filed July 22, 1949 2 SHEETS—SHEET 1
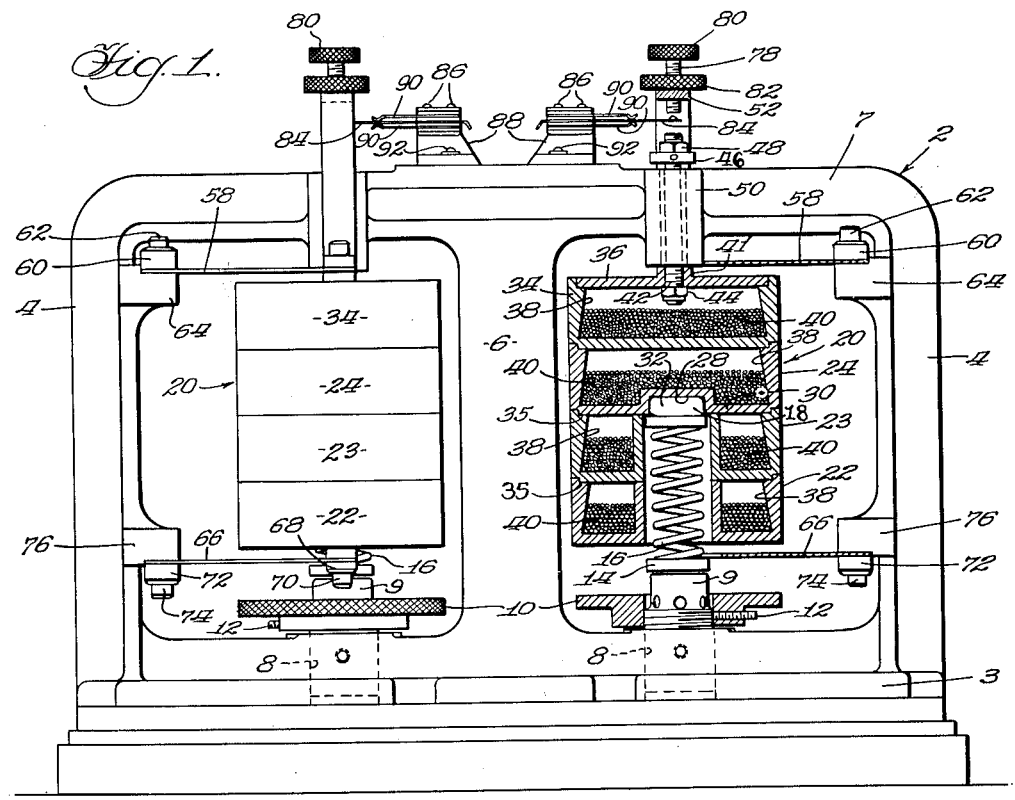
INVENTORS.
Russell C. Taylor
Leroy J. Vincent
BY
Orin O. B. Garner
Atty.

Feb. 17, 1953 R. C. TAYLOR ET AL 2,629,030
ACCELEROMETER
Filed July 22, 1949 2 SHEETS—SHEET 2

INVENTORS.
Russell C. Taylor
Leroy J. Vincent
BY
Wm. O. Garner
Atty.

Patented Feb. 17, 1953

2,629,030

UNITED STATES PATENT OFFICE 2,629,030

ACCELEROMETER

Russell C. Taylor and Le Roy J. Vincent, Granite City, Ill., assignors to American Steel Foundries, Chicago, Ill., a corporation of New Jersey Application July 22, 1949, Serial No. 106,238

6 Claims. (Cl. 200—52)

This invention relates to accelerometers and more particularly to a vertical type accelerometer adapted to record vertical impacts of a predetermined magnitude and duration.

A general object of the invention is to devise an accelerometer which is simple and economical in construction and is sufficiently rugged to withstand repeated impacts such as are commonly encountered by a railway vehicle, to which the device is particularly adapted.

A further object of the invention is to devise an accelerometer which will record and count impacts of a predetermined magnitude and duration, and which will not record other impacts.

A further object of the invention is to provide means for positively preventing the novel accelerometer from repeatedly counting a single impact, a defect which is common in similar devices known to the prior art.

A more specific object of the invention is to devise an accelerometer wherein a mass is guidably mounted for vertical movement within a frame, the mass and frame being provided with relatively movable switch contacts adapted to close an electrical circuit, due to inertia of the mass, when the frame is subjected to an impact of predetermined magnitude. Preferably, spring means are provided for yieldingly maintaining the mass in a normal position whereat the switch contacts are open.

Still another object of the invention is to provide novel means for preventing rebound of the mass when urged by the spring means to normal position.

A further object of the invention is to provide novel guide means restricting the mass to substantially vertical movement without developing friction which would resist such movement.

Another object of the invention is to devise an accelerometer such as described and a novel electrical counting system associated therewith, comprising means adapted to count each impact only once and to fail to count impacts occurring at a frequency greater than a predetermined rate.

Figure 4:
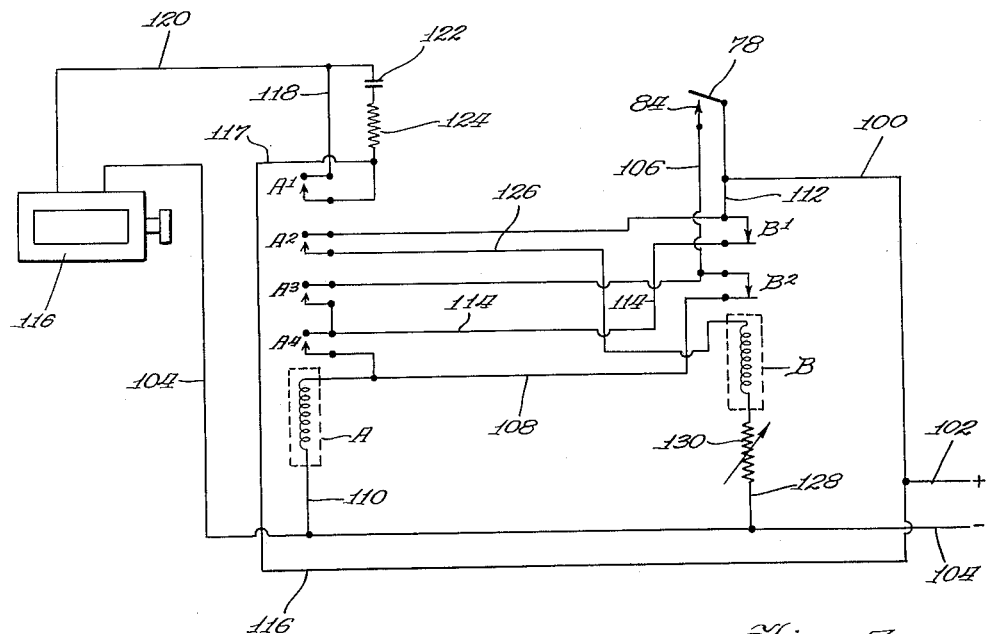
Figure 3:
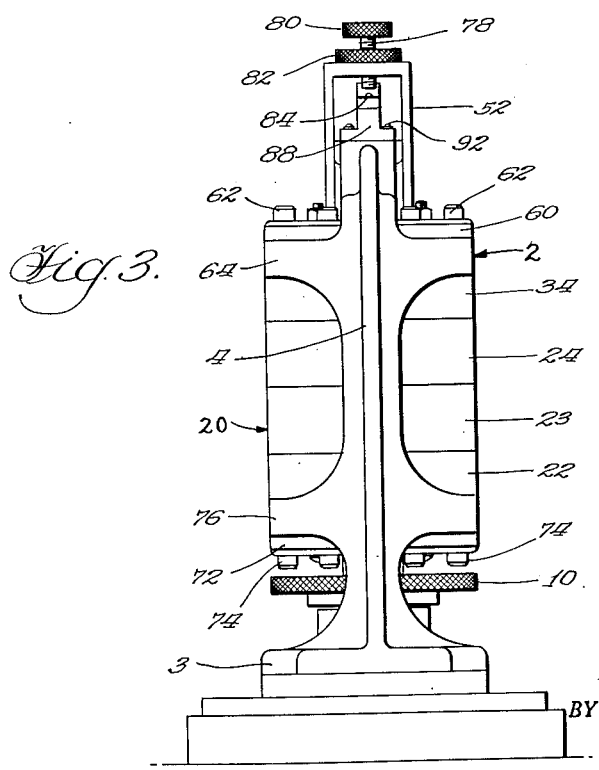

The foregoing and other objects and advantages of the invention will become apparent from consideration of the following specification and the accompanying drawings, wherein Figure 1 is a side elevational view of a frame and a pair of the novel accelerometer units therewithin, the unit at the right of Figure 1 being shown partly in central vertical section; Figure 2 is a top plan view of the structure shown in Figure 1; Figure 3 is an end view taken from the right of Figure 1; and Figure 4 is a wiring diagram of the novel electrical counting system associated with each of the accelerometer units shown in Figure 1.

Describing the invention in detail and referring first to Figures 1 to 3, the novel device comprises a frame generally designated 2 and including a base 3 with spaced end columns or pedestals 4 upstanding therefrom, and a central column 6 intermediate the columns 4, all of said columns being connected to a top web or strap 7. The base 3 is adapted for securement in any desired manner as by screws (not shown) to a movable structure such as a railway car floor or platform.

The base 3 adjacent each end thereof, is provided with a threaded opening 8 receiving a spring support rod 9 threaded therein, said rod being provided with a knurled calibrating collar 10 secured thereto, as by a set screw 12. The upper end of the rod 9 is provided with a spring seat 14 supporting the lower end of a coil spring 16, the upper end of which is engaged with a spring seat 18 supporting a composite mass, generally designated 20.

The mass 20 comprises a plurality of annular hollow segments or wafers stacked vertically, the lower two segments being indicated at 22 and 23 respectively and being formed and arranged to afford a housing for the spring 16, as best seen in the right half of Figure 1. An intermediate segment 24 is seated on the segment 23 and provides a recess 28 formed by an offset in its bottom wall 30, said recess being generally complementary to and receiving a positioning lug or boss 32 on the spring cap 18. An upper segment 34 is seated on the segment 24 and is closed by a cover plate 36. It may be noted that the segments 22, 23, 24 and 34 are dove-tailed as at 35 (Figure 1) and are provided with a substantially uniform outer diameter to afford a composite substantially cylindrical mass. The interior of each segment is in the form of a chamber 38 tapering upwardly to afford frictional resistance to upward movement of shot 40 contained within the chambers 38, and spaced from the tops thereof for a purpose hereinafter described in connection with the operation of the device.

The plate 36 is provided with an annular boss 41 engageable with the frame strap 7 under the action of coil spring 16, and a rod 42 extends through the boss 41, is threaded therewithin, and is secured by a lock nut 44. The upper end of the rod 42 is threaded into a collar 46, secured by a lock nut 48, the collar 46 being engageable with the top of a hollow boss 50 on the strap 7 to limit upward movement of the frame 2, relative to the mass 20, the rod 42 extending through the boss 50, as best seen in Figure 1.

The plate 36 is also provided with a yoke or bridge 52 receiving the boss 50 and secured to the plate 36 by screws 54 which also secure the plate 36 to spaced arms 56 of a diaphragm or spring 58 preferably formed of metal, such as phosphorus bronze, clamped by a bar 60 and screws 62 to a ledge 64 on the leg 4. The diaphragm 58 functions as a cantilever spring to yieldingly resist upward movement of the frame 2 relative to the mass 20, and to guide the mass 20 in substantially vertical movement relative to the frame without developing friction therebetween. A substantially identical diaphragm 66 is secured by clamp blocks 68 and screws 70 to the underside of the mass segment 22 and is secured by a clamp bar 72 and screws 74, to the underside of a ledge 76 on the leg 4.

The yoke 52 is provided with an adjustable contact rod 78 threaded through a complementary opening in the yoke and provided with a knurled adjusting handle or knob 80. A knurled lockwasher 82 is threaded on the rod 78. The contact 78 is engageable with a contact 84 secured by screws 86 to a bracket 88 containing top and bottom damping spring blades 90, adapted to frictionally resist oscillation of the contact 84. The bracket 88 is secured to the frame strap 7 by screws 92 extending through elongated slots 94 of the bracket 88 to accommodate adjustment thereof toward and away from the contact rod 78.

In operation of the novel accelerometer unit, an impact of a predetermined magnitude moves the frame 2 upwardly relative to the mass 20, thereby closing the contacts 78 and 84 to actuate an electrical counting system hereinafter described. The springs 16, 58 and 66 are operative to return the mass to the position shown in the drawings by urging the boss 41 against the underside of the frame boss 50; and rebounding of the mass 20 is prevented by absorbing the energy imparted thereto by the springs. This is accomplished by friction developed within the tapered chambers 38 as the shot 40 move upwardly therewithin by reason of their inertia after the bosses 41 and 50 have been reengaged. It has been found that the frictional absorption of the shot is adequate to prevent rebounding of the mass 20 after the springs have restored the same to the position shown in the drawings. In this connection, it may be noted that the mass 20 is preferably divided into a plurality of vertically spaced chambers 38 as above described, to prevent the shot 40 at the upper portion of the mass from developing a head pressure against the shot in the lower portion of the mass, a condition which would render the shot in the lower portion of the mass ineffective for the purpose above described.

Referring now to Figure 4, which is a wiring diagram of the novel electrical counting system utilized in our invention, the movable and fixed contacts 78 and 84 are diagrammatically indicated, the movable contact 78 being connected to a lead 100 which is connected to a main line 102, adapted for connection to one terminal of an associated voltage supply (not shown). The opposite terminal of said supply is connected to another main line 104.

Upon closing of the contacts 78 and 84, an initial circuit is closed through a relay A. This circuit may be traced through a lead 106 connected to the contact 84 and thence through a normally closed relay switch $B^2$ through a lead 108 connected to one terminal of the relay A, and thence through a branch lead 110 of the main line 104 connected to the other terminal of the relay A. In response to the energization of relay A which results from the closure of this initial circuit, relay switches $A^1$, $A^2$, $A^3$ and $A^4$ are also closed.

Closing of relay switch $A^4$ establishes a holding circuit through the relay A which may be traced through a branch lead 112 of the lead 100, through a normally closed relay switch $B^1$ and thence through a lead 114 and the relay switch $A^4$ through the relay A, and the branch lead 110 of the main lead 104.

Closing of relay switch $A^1$ establishes an actuating circuit through a conventional electrical counter 116 which circuit may be traced through a lead 117 of main line 102, through the switch $A^1$ and a lead 118 connected to one terminal thereof and thence through a branch lead 120 connected to a terminal of the counter 116, to the other main lead 104, which is connected to the other terminal of the counter 116. It may be noted at this point that when the circuit through the counter is broken, as hereinafter described, an electromotive force is generated by the collapse of the field about the counter coil (not shown) and this electromotive force flows through the branch lead 120 to a condenser 122 therein and thence through a resistance 124 to the lead 117 of the main line 102.

Closing of relay switch $A^2$ establishes a circuit through a relay B containing a conventional time delay (not shown), which circuit may be traced through the branch lead 112 and the switch $A^2$, and thence through a lead 126 connected to one terminal of the relay B, and through a lead 128 connected to the other terminal of the relay B, and to the main line 104, said lead 128 containing a variable resistance for adjusting the delay action of the relay B. It may be noted that the relay B upon energization thereof is adapted, after a predetermined time interval, to open relay switches $B^1$ and $B^2$, thereby breaking the initial circuit and the holding circuit through the relay A to restore the system to the original condition preparatory to counting another impact. The time delay contained in relay B causes both the opening and closure of this relay to be delayed thereby permitting the counter mechanism sufficient time to register a count and also regain its starting position before the several relay switches are in position to respond to another impact.

It may be noted that at the time switches $B^1$ and $B^2$ are opened in response to energization of the relay B, the switches $A^3$ and $A^4$ are closed and thus if the contacts 78 and 84 are still closed when the switches $B^1$ and $B^2$ open, the relay A remains energized due to a secondary holding circuit which may be traced from the lead 100 of the main line 102, through the contacts 78 and 84, and thence through the lead 106 and the switches $A^3$ and $A^4$ and the lead 108 connected to one terminal of the relay A and thence through the lead 110 connected to the other terminal of the relay A and to the other main line 104. Thus, if the contacts 78 and 84 are still closed because of the duration of the initial impact or are closed because of another impact at the time that the relay switches $B^1$ and B² are open in response to energization of the relay B, the relay A remains energized thereby maintaining all of its switches A¹, A², A³ and A⁴ closed. In this manner, the system is positively prevented from counting a single impact more than once or from counting impacts occurring at a rate greater than a predetermined rate governed by the time delay of the relay B.

In this connection it may be noted that it has been discovered in the testing of railway car trucks that impacts occurring at a rate greater than the order of 400-700 per minute, are not sufficiently significant from a viewpoint of lading and truck damage to be counted, and it will be understood from the above description that upon initial closing of the contacts 78 and 84 the time interval for one complete cycle of counting is dependent on the time delay of the relay B, and that this interval is adjustable within the range 400-700 per minute by means of the variable resistor 130. Furthermore, after a counting circuit has been closed through the counter 116, another impact sufficient to close the contacts 78 and 84 and occurring at a time interval less than the delay period of the relay B is not counted as above described. Thus, it will be understood that we have devised a novel accelerometer of rugged construction which is dependable in operation and is capable of counting impacts of a predetermined magnitude occurring at time intervals greater than a predetermined rate which may be adjusted for varying conditions to be tested.

It may be noted that, if desired, the relay A may be provided with a conventional time delay (not shown) to delay closing of this relay for an adjustable predetermined period of time subsequent to closing of the contacts 78 and 84 whereby upon closing of these contacts by an impact, the impact must be of sufficient time duration to maintain the contacts closed for a predetermined time interval governed by the delay action of the relay A, or otherwise the latter does not close its responsive switches and the impact is not counted.

We claim:

1. In switching means for an accelerometer having a frame, a movable acceleration sensing mass, stops on the mass and a member of the frame, and spring means reacting against the frame and mass for urging said stops into engagement; the combination of an opening in the frame member, pin means connected at one end thereof to the mass stop and sleeved through said opening, a bridge secured to the mass and embracing said frame member, switch contacts carried by said member and bridge, said contacts being spaced when said stops are engaged with each other, and said contacts being engageable with each other when the mass stop moves away from the member stop, and an abutment on said pin at the other end thereof engageable with the frame member to limit movement of the mass stop away from the frame stop.

2. In switching means for an accelerometer having a frame, a movable acceleration sensing mass, stops on the mass and a portion of the frame, and spring means reacting against the frame and mass for urging the mass stop against the frame stop; the combination of an opening in said frame portion, means carried by the mass and extending through said opening, an abutment carried by the last mentioned means and facing said portion and mass, a member secured to the mass and having a switch contact facing said portion, another contact carried by said portion and facing the first mentioned portion, said contacts being spaced when said stops are engaged with each other, and said contacts being engageable with each other when the mass stop moves away from the frame stop, said abutment being engageable with said portion to limit movement of the mass stop away from the frame stop.

3. In acceleration sensing means for a device of the class described; the combination of a mass adapted for movement along its longitudinal axis in response to an impact on said device, a plurality of chambers in said mass spaced from each other along said axis and tapering toward the latter, compression spring means extending through certain of said chambers and reacting against said mass approximately midway between the ends thereof for resisting said movement of the mass, cantilever springs connected to the ends of said mass, one of said cantilever springs having spaced arms embracing the compression spring means, and both of said cantilever springs acting in parallel with said compression spring means for resisting said movement of said mass.

4. In accelerating sensing means for a device of the class described; the combination of a mass adapted for movement endwise thereof in response to an impact on said device, compression spring means partially housed within the mass and reacting thereagainst approximately midway between its ends for resisting said movement thereof, and a pair of cantilever springs, each having spaced arms connected to one end of the mass at points disposed at diametrically opposite sides of the longitudinal axis of the mass.

5. In acceleration sensing means for a device of the class described; the combination of a mass adapted for movement endwise thereof in response to an impact on said device, spring means partially housed within the mass and acting thereon approximately midway between its ends for resisting said movement thereof, and a pair of cantilever springs each having spaced arms connected to one end of the mass at points disposed at opposite sides of the longitudinal axis of the mass.

6. In acceleration sensing means for a device of the class described; the combination of a mass adapted for movement in response to an impact on said device, spring means connected to the mass for resisting said movement thereof, and a pair of cantilever springs connected to said mass in parallel with each other and in parallel with said spring means, one of the cantilever springs having spaced arms disposed at opposite sides of the spring means.

RUSSELL C. TAYLOR.
LE ROY J. VINCENT.

REFERENCES CITED

The following references are of record in the file of this patent:

UNITED STATES PATENTS

| Number | Name | Date |
| --- | --- | --- |
| 2,034,649 | Brown | Mar. 17, 1936 |
| 2,283,180 | Buchanan | May 19, 1942 |
| 2,302,670 | Buchanan | Nov. 24, 1942 |

OTHER REFERENCES

Instrumentation and Results of Riding Qualities Tests by Ray W. Brown, vol. XVIII, No. 6, S. A. E. Journal, June 1926. (Copy in Div. 18 264-IMB.)